US011461200B2

(12) United States Patent
Reyes et al.

(10) Patent No.: US 11,461,200 B2
(45) Date of Patent: Oct. 4, 2022

(54) DISASTER RECOVERY FAILBACK ADVISOR

(71) Applicant: KYNDRYL, INC., New Yorl, NY (US)

(72) Inventors: Joseph Reyes, Pelham, NY (US);
Hamza Yaswi, Sterling, VA (US);
Thaddious L. Goodman, Jr.,
Clarksburg, MD (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 16/952,965

(22) Filed: Nov. 19, 2020

(65) Prior Publication Data

US 2022/0156162 A1    May 19, 2022

(51) Int. Cl.
| | |
|---|---|
| *G06F 11/00* | (2006.01) |
| *G06F 11/20* | (2006.01) |
| *G06N 20/00* | (2019.01) |
| *G06F 11/34* | (2006.01) |
| *G06F 11/30* | (2006.01) |

(52) U.S. Cl.
CPC .......... *G06F 11/203* (2013.01); *G06F 11/302* (2013.01); *G06F 11/3495* (2013.01); *G06N 20/00* (2019.01); *G06F 2201/86* (2013.01)

(58) Field of Classification Search
CPC .. G06F 11/203; G06F 11/302; G06F 11/3495; G06F 2201/86; G06N 20/00
See application file for complete search history.

(56) References Cited

U.S. PATENT DOCUMENTS

| | | | |
|---|---|---|---|
| 7,370,235 B1 * | 5/2008 | Gulve | G06F 11/1443 |
| | | | 711/162 |
| 7,770,063 B2 | 8/2010 | Robertson et al. | |
| 9,424,063 B2 | 8/2016 | Kirubanandam et al. | |
| 10,002,059 B2 | 6/2018 | Antony | |
| 10,282,196 B2 | 5/2019 | Ursal et al. | |
| 10,503,612 B1 | 12/2019 | Wang et al. | |
| 10,592,133 B1 * | 3/2020 | Bothe | G06F 3/065 |
| 11,099,956 B1 * | 8/2021 | Polimera | G06F 9/45558 |

(Continued)

FOREIGN PATENT DOCUMENTS

JP    6684243 B2    11/2018

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Joshua P Lottich
(74) *Attorney, Agent, or Firm* — Erik Swanson; Andrew M. Calderon; Roberts Calderon Safran & Cole P.C.

(57) ABSTRACT

Provided is a method, computer program product, and system for performing automated failover and/or failback recovery analysis using predictive analytics. A processor may monitor a disaster recovery (DR) life cycle during a DR scenario. The processor may monitor failover process activities in a DR production environment over a predetermined time period. Based on data collected during monitoring of the DR life cycle and the failover process activities in the DR production environment over the predetermined time period, the processor may generate, using machine learning, a failback blueprint plan to move production to a new production environment.

20 Claims, 9 Drawing Sheets

(56) References Cited

U.S. PATENT DOCUMENTS

| | | |
|---|---|---|
| 2005/0171752 A1 | 8/2005 | Patrizio et al. |
| 2010/0064168 A1* | 3/2010 | Smoot ................. G06F 11/2069 |
| | | 714/6.12 |
| 2013/0268920 A1 | 10/2013 | Ursal et al. |
| 2019/0089194 A1* | 3/2019 | Okita ................ H02J 13/00004 |
| 2019/0176843 A1 | 6/2019 | Jones et al. |
| 2019/0370121 A1* | 12/2019 | Ramachandran ....... G06F 3/067 |
| 2020/0120519 A1 | 4/2020 | Horton et al. |
| 2020/0174904 A1 | 6/2020 | Desai et al. |
| 2021/0149779 A1* | 5/2021 | Thaker .................. G06F 11/263 |
| 2021/0248047 A1* | 8/2021 | Jayaram .............. G06F 11/2041 |

* cited by examiner

| Server | RAM | Disk | CPU | Current Version | Recommended Version | Network Changes | Compute Changes | Compatible | Dependent Apps | Dependent App Servers | Assigned Change Window | Recommendations |
|---|---|---|---|---|---|---|---|---|---|---|---|---|
| 1 | 200 | 100T | 4 | v5 | v8 | Open port 443, close port 80 | 100T disk required | Yes | DB2 | Server 2 | Monday, 2PM | None |
| 1 | 200 | 200T | 4 | v2 | v3 | open port 23 | 100T disk required | Yes | DNS | Server 1 | Monday, 2PM | None |
| 3 | 100 | 100T | 2 | v7 | v9 | None | 100T disk required | No | None | None | Wednesday, 3PM | 100T disk needed |
| 4 | 200 | 200T | 2 | v7 | v9 | None | None | Yes | None | None | Thursday, 3PM | Disk will run out in 6 months |

FIG. 5

DISASTER RECOVERY FAILBACK ADVISOR

BACKGROUND

The present disclosure relates generally to the field of data recovery and, more specifically, to providing automated failover and/or failback recovery analysis using predictive analytics.

Failover is the process of temporarily switching production to a backup facility (e.g., a disaster recovery site or secondary data center) following a scheduled maintenance period or a disaster (e.g., a smoking hole scenario) at production or a local site. A failover operation is usually followed by a failback operation, which is the process of returning production to its original location. These operations use remote mirror and copy functions to reduce the time that is required to synchronize volumes after switching sites during planned or unplanned outages.

SUMMARY

Embodiments of the present disclosure include a method, computer program product, and system for performing automated failover and/or failback recovery analysis using predictive analytics. A processor may monitor a disaster recovery (DR) life cycle during a DR scenario. The processor may monitor failover process activities in a DR production environment over a predetermined time period. Based on data collected during monitoring of the DR life cycle and the failover process activities in the DR production environment over the predetermined time period, the processor may generate, using machine learning, a failback blueprint plan to move production to a new production environment.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 5 illustrates an example failback blueprint plan, in accordance with embodiments of the present disclosure.

Figure 1:
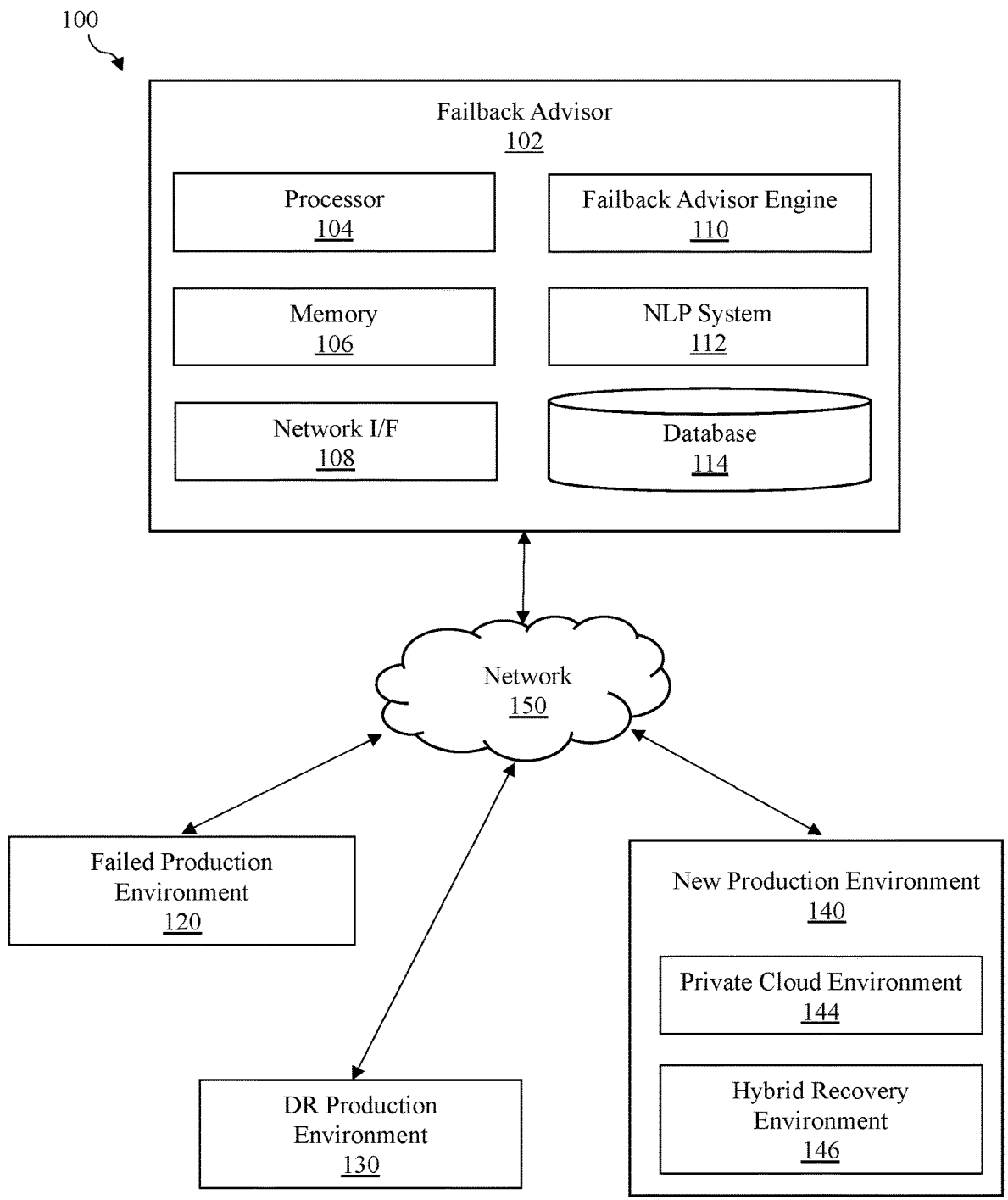
FIG. 1 illustrates a block diagram of an example system in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of data recovery and, more particularly, to performing automated failover and/or failback recovery analysis using predictive analytics. While the present disclosure is not necessarily limited to such applications, various attributes of the disclosure may be appreciated through a discussion of various examples using this context.

During a disaster scenario or a smoking hole event (e.g., an unforeseen weather event causing an entire loss/failure of an information technology (IT) system), production on a primary production site no longer exists, and the disaster recovery (DR) site takes the role of a secondary/temporary production environment. In many instances, the DR site will not have the same infrastructure, storage, compute, network, and/or device capabilities as the primary site. When running production applications in the DR site which assumes production workloads during smoking hole scenarios, exposures in capacity, technologies, and recovery posture will be noted. During steady state, DR production workloads may be retrofitted on the fly in order to expand capacity to enable production to run for months before falling back to a new production environment.

To failback to a new production environment, an evaluation needs to be made to bring back production without causing outages since there may be no DR site associated with the new production environment. The new production environment needs to be retrofitted or configured to enable new technologies and/or shorter recovery time objective (RTO)/recovery point objective (RPO). Consequently, the DR site which previously ran the recovery production environment also has to retrofitted to fit new production capability, technologies, replication and SLA related to the new production environment. This end-to-end recovered production in DR, failback, and DR reconfiguration is highly manual, involves multiple platform owners to orchestrate, and is slow/error prone, often resulting in production capacity being oversubscribed or undersubscribed which is costly and painful to remediate during steady state or failover recovery.

Embodiments of the present disclosure relate to a method, computer program product, and system for utilizing predictive analytics to generate failback and DR retrofit blueprints which provide recommendations on application mappings to make use of new technologies, workload consolidation, data center location, public/private clouds, and the like. Using the blueprints accommodates changes and/or predicted upgrades in an IT infrastructure to configure both new production and DR production environments to achieve short RPO/RTOs.

In embodiments, the system may utilize a failback advisor to analyze data collected from the disaster life cycle during a disaster (e.g., smoking hole) scenario. The failback adviser may perform various analyses on the data collected during the disaster life cycle while monitoring key failover activities such as resource availability, amount of data, recovery steps, replication of applications, and the like. Also, during DR production, the failback advisor may monitor steady state application dependencies and communications to understand application mappings. Using the data collected by the failback adviser during failover and DR production workload steady state, the failback advisor generates a failback blueprint plan to bring back production to a new production environment. Using predictive analytics, the failback advisor can make recommendations that achieve shorter RPO/RTO during recovery.

Further, the failback advisor may make additional recommendations on how to reconfigure an existing or new DR site that includes capabilities to support the new production site. In this way, the failback adviser may be configured to predict improved application sequencing/order of priority for application/data replication that is more efficient when replicating data during failback without causing an outage in production, since a respective client/business will be running production applications in both new production and DR production sites at any one-time during failback.

In embodiments, the failback advisor may monitor failover process activities in a DR production environment (e.g., data center) over a predetermined time period. For example, the failback advisor may monitor various activities such as application sequencing, data movement, bandwidth usage, dependent applications, end user testing, incident management data, manual configurations, change management, and application user testing over a predetermined time period (e.g., 1 day, 1 week, 1 month, 1 year, etc.). The failback advisor monitors the failover process activities in order to determine if any changes/upgrades have been made (e.g., upgrades to software, hardware, disk space, usage trends, etc.) to the DR production environment that may require modernizing the infrastructure/platform in a new production environment.

In embodiments, the failback advisor may generate, using machine learning, a failback blueprint plan to bring back production to a new production environment. The generation of the failback blueprint may be based on the data collected during monitoring of the DR life cycle and the failover process activities in the DR production environment over the predetermined time period. For example, the failback advisor may utilize machine learning to make predictions on what components and/or changes are necessary to implement failback procedures in the new production environment based on the current process workloads associated with the DR production environment in order to bring back production in a shorter RPO/RTO.

In some embodiments, the failback advisor may execute the failback blueprint plan in the new production environment. In some embodiments, the failback blueprint plan may be implemented automatically by the failback advisor (e.g., sending the blueprint plan to an orchestrator) or manually by sending/outputting the failback blueprint plan to a user (e.g., administrator, IT personal, etc.).

In some embodiments, the failback advisor may monitor failback conditions in the new production environment, including new production workloads, application latencies, and bandwidth dependency metrics. In some embodiments, as the failback process is executed, the failback advisor will continuously monitor failback conditions in the new production environment to determine needs/requirements for retrofitting the initial or a second (new) DR production environment.

In some embodiments, the failback advisor may generate, using machine learning, a DR retrofit blueprint plan based on the monitored failback conditions for the new production environment and the monitored failover process activities in the DR production environment. In some embodiments, the DR retrofit blueprint plan may be used to recommend changes to reconfigure the initial DR production environment to meet the demands, capabilities, and technologies of the new production environment. In some embodiments, the DR retrofit blueprint plan may be used make recommendations based on capabilities of a new or second DR production environment. In some embodiments, the new or second DR production environment may be a new DR production environment that includes the necessary DR capabilities for supporting the new production environment. In this way, the failback advisor looks at the entire life cycle for a smoking hole disaster recovery scenario, monitors failover, steady state recovery, failback activities, and then proposes a blueprint to retrofit the DR production environment for new production capability.

In some embodiments, the respective steps of monitoring/collecting DR life cycle data, monitoring failover process activities in a DR production environment, and generating the failback blueprint plan and/or the DR retrofit blueprint plan may be performed automatically by using machine learning. The term "machine-learning"—and based on that the term "machine-learning model"—may denote known methods of enabling a computer system to improve its capabilities automatically through experience and/or repetition without procedural programming. Thereby, machine-learning can be seen as a subset of artificial intelligence. Machine-learning algorithms build a mathematical model—i.e., the machine-learning model—based on sample data, known as "training data", in order to make predictions or decisions without being explicitly programmed to do so.

The aforementioned advantages are example advantages, and not all advantages are discussed. Furthermore, embodiments of the present disclosure can exist that contain all, some, or none of the aforementioned advantages while remaining within the spirit and scope of the present disclosure.

Turning now to the figures, FIG. 1 illustrates a block diagram of an example system 100 in which illustrative embodiments of the present disclosure may be implemented. In some embodiments, the system 100 may include a failback advisor 102, a failed production environment 120, a DR production environment 130, and a new production environment 140.

Consistent with various embodiments, the failback advisor 102, the failed production environment 120, the DR production environment 130, and the new production environment 140 may be or include computer systems. In some embodiments, the failback advisor 102, the failed production environment 120, the DR production environment 130, and the new production environment 140 may be or include one or more systems that are substantially similar to computer system 1101 of FIG. 7. In some embodiments, the failed production environment 120, the DR production environment 130, and the new production environment 140 may be cloud computing environments. For example, the failed production environment 120, the DR production environment 130, and the new production environment 140 may each comprise multiple servers, storage devices, networks, and the like. In some embodiments, the failed production environment 120, the DR production environment 130, and the new production environment 140 may be substantially similar cloud computing environment 50 illustrated in FIG. 8.

The failback advisor 102, the failed production environment 120 (prior to failure), the DR production environment 130, and the new production environment 140 may be distant from each other and communicate over a network 150. In some embodiments, the failback advisor 102 may be a central hub from which the failed production environment 120, the DR production environment 130, and the new production environment 140 can establish a communication connection, such as in a client-server networking model. Alternatively, the failback advisor 102, the failed production environment 120, the DR production environment 130, and the new production environment 140 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an interne, or an intranet. In certain embodiments, the failback advisor 102, the failed production environment 120, the DR production environment 130, and the new production environment 140 may be local to each other, and communicate via any appropriate local communication medium. For example, the failback advisor 102, the failed production environment 120, the DR production environment 130, and the new production environment 140 may communicate using a local area network (LAN), one or more hardwire connections, a wireless link or router, or an intranet. In some embodiments the failback advisor 102, the failed production environment 120, the DR production environment 130, and the new production environment 140 may be communicatively coupled using a combination of one or more networks and/or one or more local connections. For example, the failback advisor 102 may be hardwired to the DR production environment 130 (e.g., connected with an Ethernet cable), while the new production environment 140 may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more environments and configured to share resources over the network 150. In embodiments, network 150 may be substantially similar cloud computing environment 50 illustrated in FIG. 8.

In the illustrated embodiment, the failback advisor 102 may include one or more processors 104 and one or more memories 106. The failback advisor 102 may be configured to communicate with each of the failed production environment 120, the DR production environment 130, and the new production environment 140 through an internal or external network interface 108. In some embodiments, the failback advisor 102 may be equipped with a display or monitor. Additionally, the failback advisor 102 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the failback advisor 102 may be a server, desktop, laptop, or hand-held device. In some embodiments, the failback advisor 102 may be configured as a virtual machine that is accessible over network 150. In embodiments, the failed production environment 120, the DR production environment 130, and the new production environment 140 may also contain similar components (e.g., processors, memories, network I/F) as the failback advisor 102, however, for brevity purposes these components are not shown.

In the illustrated embodiment, the failback advisor 102 further includes a failback advisor engine 110, a natural language processing system 112, and a database 114.

In embodiments, the failback advisor engine 110 is configured to monitor, collect, gather, and/or analyze disaster life cycle data from the failed production environment 120, the DR production environment 130, and/or the new production environment 140. For example, the failback advisor engine 110 may monitor various types of data (e.g., meta data) indicating the last possible replication prior to the failed production environment 120 experiencing a disaster scenario. In another example, the failback advisor engine 110 may monitor and/or collect data from the DR production environment 130 that provides details regarding application dependencies, steady state recovery, failback activities, bandwidth usage, and the like. An example failback advisor engine is discussed in more detail in FIG. 2.

In some embodiments, the failback advisor 102 may utilize NLP system 112 to analyze unstructured textual content collected from the disaster life cycle data in order to make predictions on what types of components and/or requirements to recommend when generating a failback blueprint plan and/or DR retrofit blueprint plan. For example, the failback advisor engine 110 may utilize NLP system 112 to analyze various hardware specifications, upgraded operating system requirements, and/or bill of materials (BOM) to make determinations or predictions used for generating the failback blueprint. In embodiments, the NLP system 112 may include a natural language processor having numerous subcomponents, such as a tokenizer, a part-of-speech (POS) tagger, a semantic relationship identifier, and a syntactic relationship identifier. An example natural language processing system is discussed in more detail in reference to FIG. 6.

In embodiments, the failback advisor 102 may store and/or retrieve the failback blueprint plans and DR retrofit blueprint plans on the database 114. In some embodiments, the blueprints may be retrieved from the database 114 and outputted to a user. For example, the failback advisor 102 may be accessible via a cloud-based application where the failback blueprint plan may be retrieved and displayed to the user on a communicatively coupled user device (not shown).

In embodiments, the failback advisor engine 110 may use machine learning to improve its capabilities automatically through training, experience, and/or repetition without procedural programming. For example, the failback advisor engine 110 may use machine learning to analyze DR production data to make predictions for application sequencing during failback. The failback advisor engine 110 may predict the order of priority of application sequencing that will prevent outages in production based on capabilities and/or requirements of the DR production environment. The failback advisor engine 110 may utilize a feedback mechanism that may aide in making and/or adjusting predictions or recommendations. For example, the feedback mechanism may collect data indicating that a set of applications were attempted to be moved/replicated to the new production environment 140 within a predetermined time period but failed. Using this feedback data, the failback advisor engine 110 can recommend increasing the time and/or bandwidth for moving the set of applications, accordingly.

In some embodiments, the failback advisor engine 110 may utilize supervised machine learning to make predictions. For example, the failback advisor engine 110 may be supplied with a list or set of cloud providers that have capabilities that meet requirements for establishing the new production environment 140. For example, the failback advisor engine 110 may generate a failback blueprint plan for the new production environment 140 that recommends a private cloud environment 144 and/or a hybrid recovery environment 146 (e.g., public cloud, private cloud, on premise, etc.) based on availability of new technology. In this way, the failback advisor engine 110 may predict which providers may be best for establishing the new production and DR environments based on need.

In embodiments, machine learning algorithms can include, but are not limited to, decision tree learning (e.g., random forest), association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

While FIG. 1 illustrates an example system 100 with a single failback advisor 102, a single failed production environment 120, a single DR production environment 130, and a single new production environment 140, suitable computing environments for implementing embodiments of this disclosure may include any number of failback advisors, failed production environments, DR production environments, and new production environments. The various modules, systems, and components illustrated in FIG. 1 may exist, if at all, across a plurality of failback advisors, failed production environments, DR production environments, and new production environments.

It is noted that FIG. 1 is intended to depict the representative major components of an exemplary system 100. In some embodiments, however, individual components may have greater or lesser complexity than as represented in FIG. 1, components other than or in addition to those shown in FIG. 1 may be present, and the number, type, and configuration of such components may vary.

Figure 2:
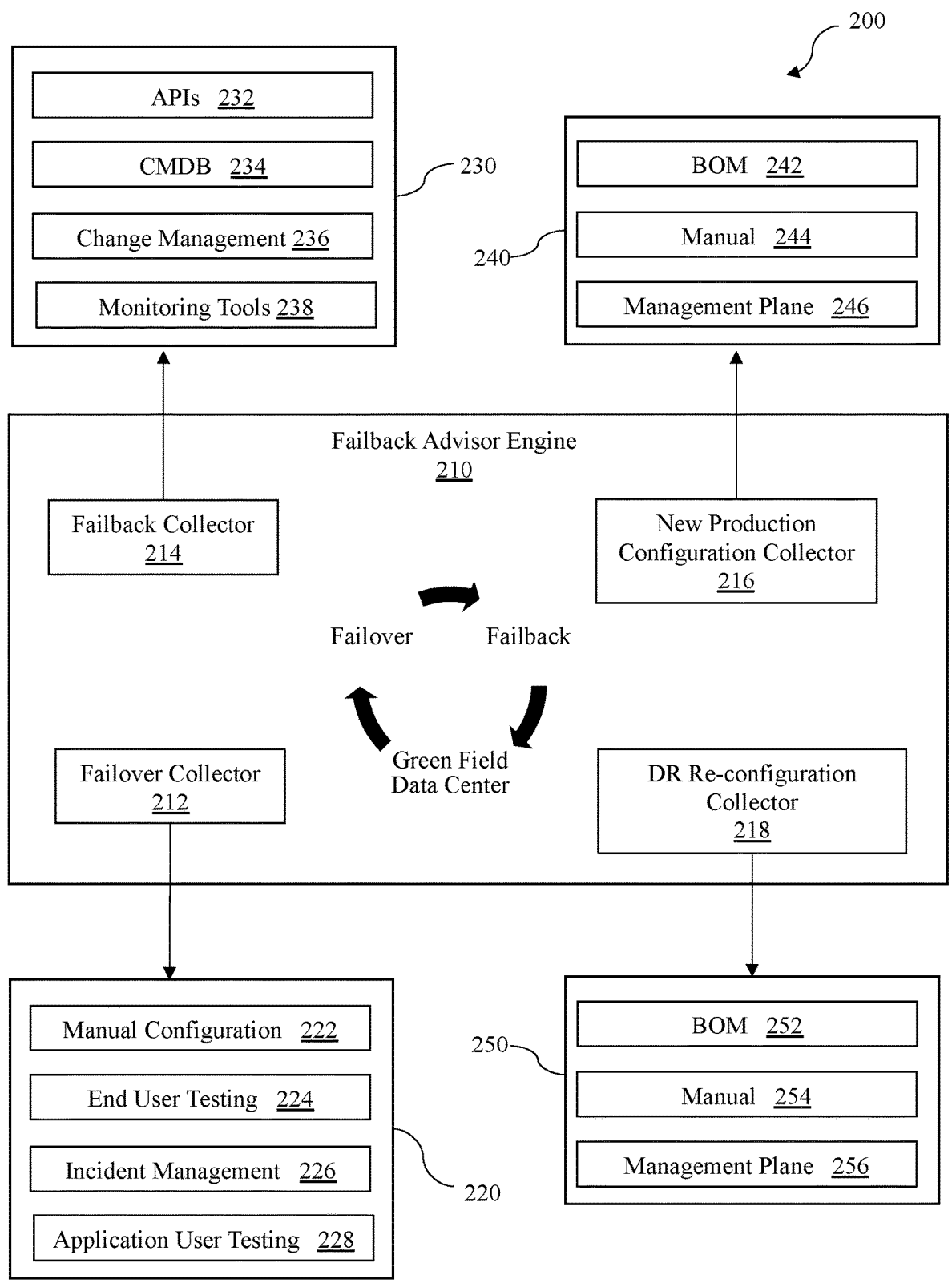
FIG. 2 illustrates an example block diagram of a failback advisor engine, in accordance with embodiments of the present disclosure.

Referring now to FIG. 2, shown is an example block diagram of a failback/failover life cycle 200 implemented by a failback advisor engine 210, in accordance with embodiments of the present disclosure. In some embodiments, the failback advisor engine 210 may be substantially similar to the failback advisor engine 110 in FIG. 1. In the illustrated embodiment, the failback advisor engine 210 include a failover collector 212, a failback collector 214, a new production configuration collector 216, and a new DR re-configuration collector 218. The failback advisor engine 210 may be configured to monitor failover sources 220, failback data sources 230, production characteristics/attributes 240, and production characteristics/attributes 250 during the entire disaster recovery life-cycle process, such as during failover, failback, and green field data center deployment.

In embodiments, the failover collector 212 is configured to collect data from failover data sources 220 while monitoring the failover process. The failover collector 212 may collect data from failover data sources 220 such as manual configurations 222, end user testing 224, incident management 226, and application user testing 228. Data collections from these sources allows the failback advisor engine 210 to learn various characteristics or attributes from the initial failover process when moving data from a failed production environment to a DR production environment. For example, the data collected from manual configurations 222 and end user testing 224 may allow the failback advisor to determine various characteristics such as bandwidth usage, data movement, application sequencing, RTO, and RPO. In another example, data collected from incident management 226 and application user testing 228 may indicate various success and failure rates when initiating failover procedures for various applications. For example, the failover collector 212 may collect data indicating a last point in time when data replication occurred prior to the production environment experiencing failure (e.g., a disaster scenario).

In embodiments, the failback collector 214 is configured to collect data from failback data sources 230 while monitoring any changes in the DR production environment during the failback process. The failback collector 214 may collect data from data sources 230 such as APIs 232, configuration management database (CMDB) 234, change management 236, and various monitoring tools 238. For example, the failback collector 214 may collect data from CMDB 234 indicating changes in disk space (e.g., increases/decreases) associated with the DR production environment. In another example, the failback collector 214 may collect data from APIs to make determinations on software application performance and/or CPU performance and make suggestions on upgrade related software versions or hardware. The failback collector 214 may utilize analytics for logical mapping (ALDM) to collect and analyze data to understand the current DR production environment (e.g., versions of OS, usage trends, infrastructure/platforms, etc.) with respect to its current workload processes and determine future workload process needs/capabilities in a new production environment. In this way, the failback advisor engine 210 can monitor any upgrades/changes in the IT infrastructure of the DR production environment and predict future requirements in a new production environment.

In embodiments, the new production configuration collector 216 may collect and/or monitor data related to various production characteristics/attributes 240 of the new production environment as failback to the new production environment is implemented. The production characteristics/attributes 240 may include bill of material (BOM) 242, manual configurations 244, and management plane 246 information regarding the new production environment. For example, the new production configuration collector 216 may collect data from the BOM 242 indicating the hardware models and/or hardware capacity (e.g., storage, RAM, CPU) of the new production environment. In another example, the new production configuration collector 216 may collect data from the management plane 246 to determine management and configuration of all layers of the network stack and other components of the new production environment. In embodiments, the failback advisor engine 210 may use various machine learning techniques (e.g., NLP/NLU) to analyze the collected data in order to understand the configuration of the new production environment. For example, using NLP, the failback advisor engine 210 may determine from various hardware/software specifications (e.g., from BOM 242) what types of versions or upgrades have been made in the new production environment.

In embodiments, the DR re-configuration collector 218 is configured to collect and/or monitor data from various production characteristics/attributes 250 related to a new DR production environment and/or from the initial DR production environment. For example, the DR re-configuration collector 218 may collect data from BOM 252, manual 254, and/or management plane 256 that was related to the initial DR production environment or a new DR production environment. Using this data, the failback advisor engine 210 may generate a retrofit DR blueprint plan to upgrade/fit production technologies for the initial DR production environment to be compatible with the new production environment. For example, when migrating from the initial DR production environment to the new production environment during the failback process, the initial DR production environment may contain older hardware and/or software versions that may no longer be optimal/compatible with the new production environment (e.g., modernized hardware, new versions, increases in bandwidth, etc.). The DR re-configuration collector 218 may collect this data allowing the failback advisor 210 to make recommendations and/or generate a DR retrofit blueprint plan to upgrade the initial or old DR production environment in order to make it compatible for disaster recovery procedures and process related to the new production environment. In some embodiments, the DR re-configuration collector 218 may collect/monitor data from a new DR production environment rather than retrofitting an older DR production environment that may be running on older software/hardware versions. For example, the DR re-configuration collector 218 may collect changes in hardware models, bandwidth between datacenters (environments), hardware capacity, security platforms, locations of datacenters (e.g., on premise/off premise, cloud configurations, etc.). Using this data, the failback advisor 210 may generate a DR blueprint plan for the new DR production environment such that it protects against any production losses during a disaster scenario experienced by the new production environment.

Figure 3:
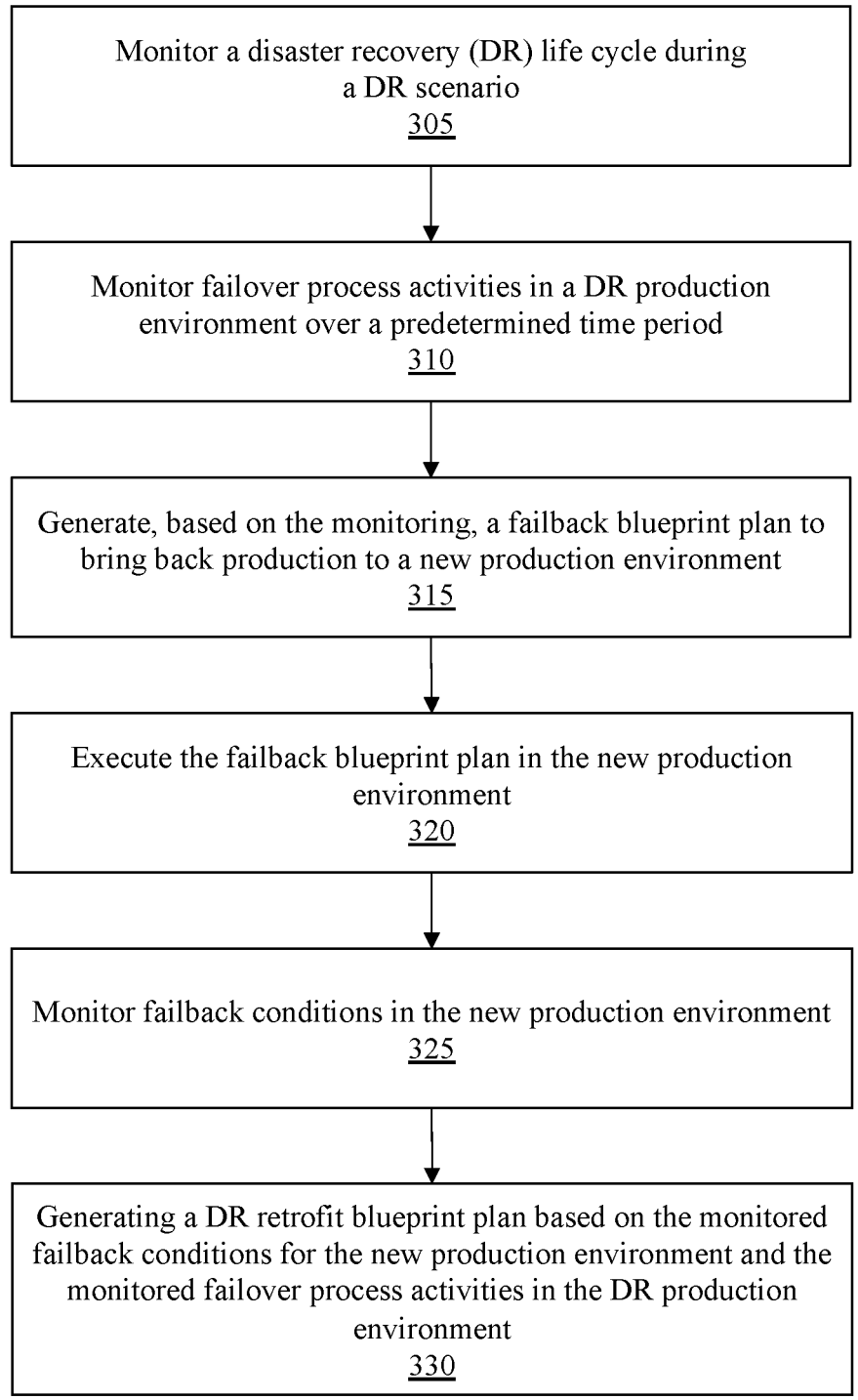
FIG. 3 illustrates a flow diagram for monitoring a disaster life cycle to generate a failback blueprint plan, in accordance with embodiments of the present disclosure.

Referring now to FIG. 3, shown is a flow diagram of an example process 300 for monitoring the disaster life cycle to generate a failback plan and a disaster recovery plan, in accordance with embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. The process 300 may be performed by processor 104 of FIG. 1.

The process 300 begins by monitoring a disaster recovery (DR) life cycle during a DR scenario. This is illustrated at step 305. For example, the failback advisor (e.g., failback advisor 102 of FIG. 1) may monitor the failover process when a production environment suffers a disaster scenario (e.g., smoking hole). For example, the failback advisor may monitor and/or collect data associated with DR production steady state application dependencies and communications to understand application mappings.

The process 300 continues by monitoring failover process activities in a DR production environment over a predetermined time period. This is illustrated at step 310. In embodiments, the failback advisor may monitor various activities such as application sequencing, data movement, bandwidth usage, dependent applications, end user testing, incident management data, manual configurations, change management, and application user testing over a predetermined time period (e.g., 1 day, 1 week, 1 month, 1 year, etc.). The failback advisor monitors the failover process activities in order to determine if any changes/upgrades have been made (e.g., upgrades to software, hardware, disk space, usage trends, etc.) to the DR production environment that may require upgrading/implementing/modernizing the infrastructure/platform of a new production environment. For example, the DR production environment may be running various platforms and applications on traditional data systems, however, with the availability of new technology (e.g., upgraded cloud/hybrid cloud), the failback advisor may make recommendations to move some platforms to newer systems or cloud data centers while leaving some applications on the traditional data systems.

The process 300 continues by generating, using machine learning, a failback blueprint plan to bring back production to a new production environment. This is illustrated at step 315. The generation of the failback blueprint plan may be based on the data collected during monitoring of the DR life cycle (step 305) and the failover process activities (step 310) in the DR production environment over the predetermined time period. For example, the failback advisor may utilize machine learning to make predictions on what components and/or changes are necessary to implement failback procedures in the new production environment based on the current process workloads associated with the DR production environment. For example, the failback advisor may recommend consolidating an AIX system to a Linux system or a physical AIX LPARs to a VIO server/client. In this way, the failback blueprint may be used to bring back production in a shorter RPO/RTO.

In some embodiments, the process 300 continues by executing the failback blueprint plan in the new production environment. This is illustrated at step 320. In some embodiments, using the failback blueprint plan, the failback advisor may implement/execute the failback plan on the new production environment. In embodiments, this may be implemented automatically by the failback advisor (e.g., sending the blueprint plan to an orchestrator) or manually by sending/outputting the failback blueprint plan to a user (e.g., administrator, IT personal, etc.). For example, based on the failback blueprint plan, the orchestrator may map various applications to appropriate destinations (servers), implement or schedule predicted/recommended change windows for sequencing, update various software to a recommended version, perform required network changes (e.g., open and close networking ports), and the like.

In some embodiments, the failback advisor may utilize a feedback learning model to analyze and/or address various issues during the failback process. For example, the feedback learning model may identify a set of application having a certain data size (e.g., 10 GB) were scheduled for a change window having a first predetermined time period (e.g., 3 hours). However, the feedback learning model may analyze data indicating the set of application failed to be moved during failback during the first predetermined time period. Using this data, the feedback learning model can make predictions/recommendations for implementing a second predetermined time period (e.g., 4 hours) that would allow for the set of applications to be successfully moved during failback. As more feedback data is received by the feedback learning model, the failback advisor can make adjustments to the failback blueprint plan and implement those adjustments accordingly. The feedback may also be used to influence the initial failback blueprint plans for future failure events.

In some embodiments, the process 300 continues by monitoring failback conditions in the new production environment including new production workloads, application latency, and bandwidth dependency metrics. This is illustrated at step 325. In some embodiments, as the failback process is executed, the failback advisor will continuously monitor failback conditions in the new production environment to determine requirements for a retrofitted or second (new) DR production environment.

In some embodiments, the process 300 continues by generating, using machine learning, a DR retrofit blueprint plan based on the monitored failback conditions for the new production environment and the monitored failover process activities in the DR production environment. This is illustrated at step 330. In some embodiments, the DR retrofit blueprint plan may be used to recommend changes to reconfigure or retrofit the initial DR production environment to meet the demands/capabilities/technologies of the new production environment. In some embodiments, the DR retrofit blueprint plan may be used make recommendations on capabilities of a new or second DR production environment. In some embodiments, the new or second DR production environment may be a new DR production environment that includes the necessary DR capabilities for the new production environment. In this way, the failback advisor looks at the entire life cycle for a smoking hole disaster recovery scenario, monitors failover, steady state recovery, failback activities, and then proposes a blueprint to retrofit the DR production environment for new production capability.

Figure 4:
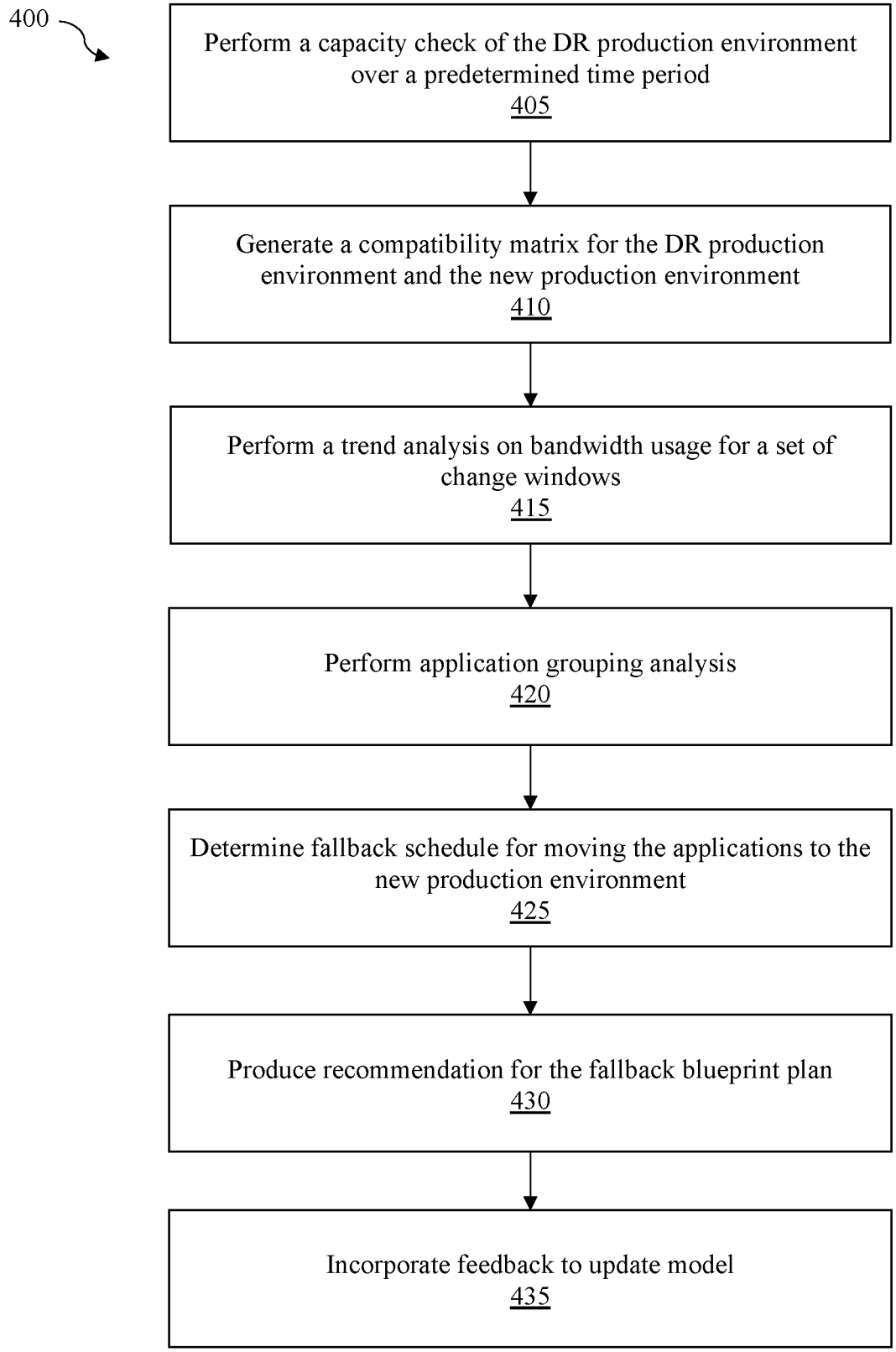
FIG. 4 illustrates a flow diagram of an example process for generating a failback blueprint plan, in accordance with embodiments of the present disclosure.

Referring now to FIG. 4, shown is a flow diagram of an example process 400 for generating a failback blueprint plan for a new production environment, in accordance with embodiments of the present disclosure. The process 400 may be performed by processing logic that comprises hardware (e.g., circuitry, dedicated logic, programmable logic, microcode, etc.), software (e.g., instructions run on a processor), firmware, or a combination thereof. In some embodiments, the process 400 is a computer-implemented process. The process 400 may be in addition to or a subset of process 300. The process 400 may be performed by processor 104 of FIG. 1.

The process 400 begins by performing a capacity check of the DR production environment over a predetermined time period to identify a growth rate of the new production environment. This is illustrated at step 405. For example, the failback advisor (e.g., failback advisor 102 of FIG. 1) may perform a capacity check by analyzing various characteristics of the DR production environment (e.g., software versions, hardware upgrades, sequencing applications, etc.) over a certain time period (e.g., 1 week, 3 months, 2 years). In this way the failback advisor may identify any changes/upgrades to the DR production that have occurred to maintained workload processes over time.

The process 400 continues by generating, using natural language processing, a compatibility matrix for the DR production environment and the new production environment. This is illustrated at step 410. For example, the failback advisor may generate a compatibility matrix for comparing the characteristics of the DR production environment to the new production environment. For example, the compatibility matrix may compare various hardware and software specifications between the DR production environment and the new production environment. For example, the compatibility matrix may compare hardware specs, OS requirements/upgrades, application OS/hardware requirements, and or network port changes.

The process 400 continues by performing a trend analysis on bandwidth usage for a set of change windows to determine an amount of bandwidth needed during failback. This is illustrated at step 415. In embodiments, the failback advisor may analyze trends regarding bandwidth usage during change windows to determine the capabilities/requirements for the new production environment. For example, based on a trend analysis showing failures during change windows for application backup due to bandwidth inefficiencies, the failback advisor may recommend increases in bandwidth for the new production environment. The failback advisor may determine bandwidth dependency metrics based on how much data can be replicated at any given time and use this to make recommendations for hardware/software improvements.

The process 400 continues by determining application grouping analysis to identify which applications are required to be moved together to the new production environment. This is illustrated at step 420. For example, the failback advisor may determine which applications may depend on each other when being moved/replicated to the new production environment and recommend moving these grouped/dependent application during the same change window. In some embodiments, application grouping analysis may be perform using ALDM.

The process 400 continues by determining a failback schedule for moving the applications to the new production environment. This is illustrated at step 425. In embodiments, the failback advisor may evaluate various application latencies and identify improved sequencing for application replication and/or recovery. For example, the failback advisor may identify a failback schedule that optimizes what time a certain application(s) should be moved in order to avoid application downtime due to migration. In some embodiments, the failback advisor may collect data from a weather API in order to account for downtime due to unexpected weather occurrences when determining failback scheduling for application.

The process 400 continues by producing recommendations for the failback blueprint plan. This is illustrated at step 430. In embodiments, the recommendations may be made using predictions based on at least one criteria selected from the group consisting of the capacity check, the compatibility matrix, the trend analysis, the application grouping, and the failback schedule that were generated in steps 405-425 above. Using the analyzed data, the failback advisor can generate the failback blueprint plan for use during failback to the new production environment. An example failback blueprint plan is described in FIG. 5. Once the failback blueprint plan has been generated, the failback advisor may send the failback blueprint plan to an orchestrator (or an administrator) to execute the plan during the failback process.

In some embodiments, the process 400 continues by incorporating feedback to update the prediction model for generating/updating the failback blueprint plan. This is illustrated at step 435. In embodiments, as the failback process begins or is executed using the failback blueprint plan, the failback advisor may utilize a feedback model to monitor various data to understand how the failback process is performing. For example, the feedback model may monitor bandwidth usages, user inputs, and/or perform orchestrator monitoring to identify and issues or inefficiencies during failback and make changes to the failback blueprint plan accordingly.

Referring now to FIG. 5, shown is an example failback blueprint plan 500, in accordance with embodiments of the present disclosure. In the illustrated embodiment, the failback blueprint plan 500 includes recommendations for various implementations to incorporate when establishing a new production environment based on the current configuration and capabilities of the DR production environment. For example, the failback blueprint plan 500 may identify the current version 504 of various software (e.g., OS systems, applications, etc.) used by each server 502 in the DR production environment and make suggestions on whether to upgrade to a recommended version 506. The recommended version 506 may be determined based on an availability of new technologies (e.g., upgraded systems, new hardware capabilities, increased bandwidth, etc.). In another example, the failback blueprint plan 500 may recommend various network changes 508, such as opening and/or closing network ports, by analyzing textual content (using NLP analysis) related to upgrades of system. The failback blueprint plan 500 may indicate various compute changes 510 that may be required, such as the amount of disk space needed for the system, whether there are dependent applications 512 related to a specific server, and any compatibility requirements. The failback blueprint plan 500 may recommend various assigned change windows 514 for moving applications from the DR environment to the new production environment. The failback blueprint plan 500 may also provide recommendations 516 (e.g., that server 3 needs 100 terabytes of additional disk space and that server 4 will run out of disk in 6 months). In some embodiments, the failback blueprint plan 500 may be sent/output to an orchestrator (not shown) where the plan may be automatically implemented and/or executed to configure the new production environment. In some embodiments, the failback blueprint plan 500 may be sent/output to a user/administrator to aide in the disaster recovery decision making process.

Figure 6:
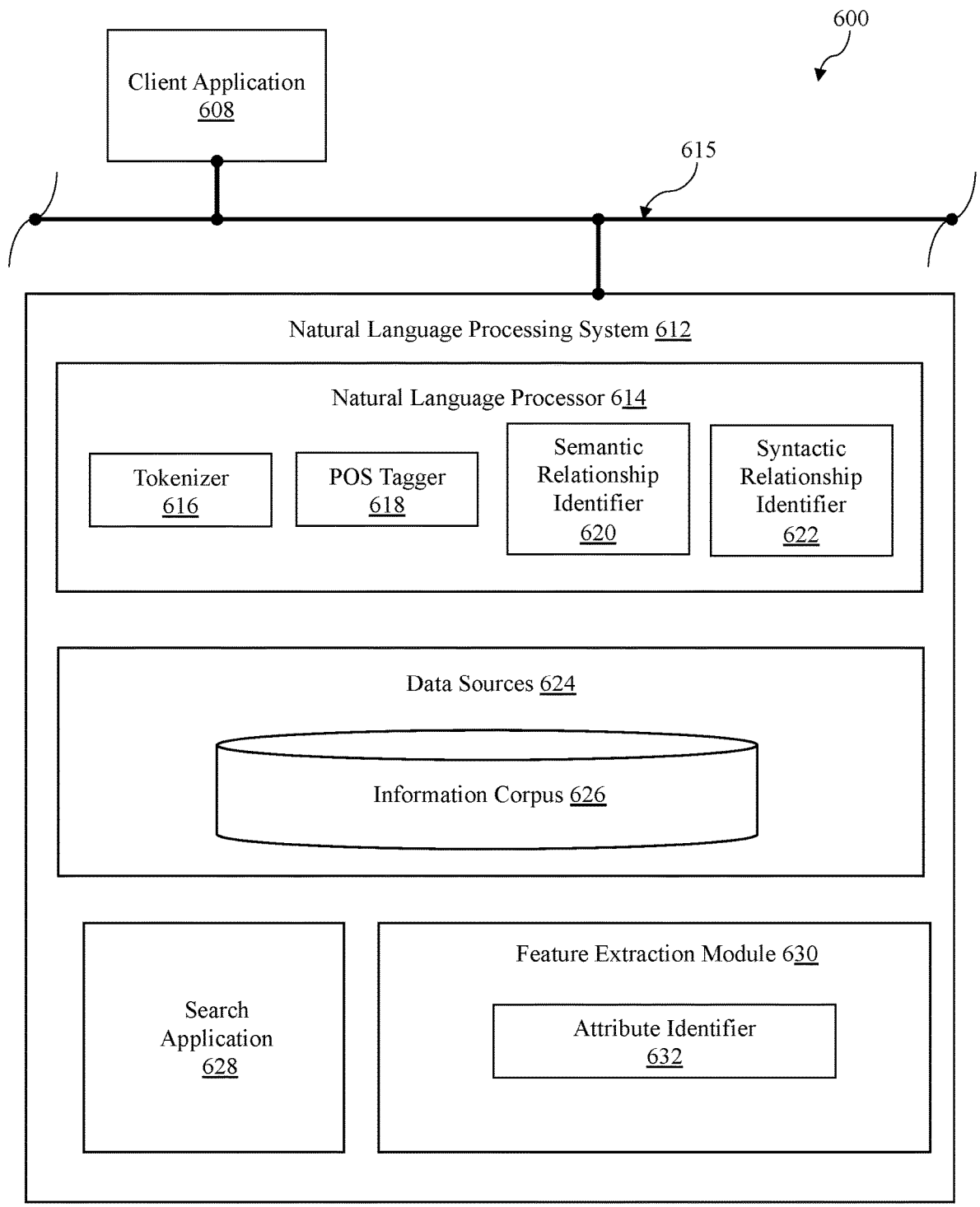
FIG. 6 illustrates a block diagram of an example natural language processing system configured to extract features from data generated from the disaster life cycle, in accordance with embodiments of the present disclosure.

Referring now to FIG. 6, shown is a block diagram of an exemplary system architecture 600, including a natural language processing system 612, configured to extract features from data generated from the disaster life cycle, in accordance with embodiments of the present disclosure. In some embodiments, the natural language processing system 612 may include a natural language processor 614, data sources 624, a search application 628, and a feature extraction module 630. The natural language processor 614 may be a computer module that analyzes the collected/received/monitored DR life cycle data from the failed production environment 120, the DR production environment 130, and/or the new production environment 140 described in FIG. 1. In some embodiments, the DR life cycle data may comprise unstructured data (e.g., BOM, hardware specs, upgrade OS requirements, network port changes, etc.) related to various components and or systems of the failed production environment 120, the DR production environment 130, or the new production environment 140. The natural language processor 614 may perform various methods and techniques for analyzing the DR life cycle data (e.g., syntactic analysis, semantic analysis, etc.). The natural language processor 614 may be configured to recognize and analyze any number of natural languages. In some embodiments, the natural language processor 614 may parse passages or snippets of the DR life cycle data. Further, the natural language processor 614 may include various modules to perform analyses of the DR life cycle data. These modules may include, but are not limited to, a tokenizer 616, a part-of-speech (POS) tagger 618, a semantic relationship identifier 620, and a syntactic relationship identifier 622.

In some embodiments, the tokenizer 616 may be a computer module that performs lexical analysis. The tokenizer 616 may convert a sequence of characters into a sequence of tokens. A token may be a string of characters included in the DR life cycle data and categorized as a meaningful symbol. Further, in some embodiments, the tokenizer 616 may identify word boundaries in the DR life cycle data and break any text passages into their component text elements, such as words, multiword tokens, numbers, and punctuation marks. In some embodiments, the tokenizer 616 may receive a string of characters, identify the lexemes in the string, and categorize them into tokens.

Consistent with various embodiments, the POS tagger 618 may be a computer module that marks up a word in passages to correspond to a particular part of speech. The POS tagger 618 may read a passage or other text in natural language and assign a part of speech to each word or other token. The POS tagger 618 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed DR life cycle data (e.g., the content of a first BOM as compared to the content of a second BOM). Examples of parts of speech that may be assigned to words include, but are not limited to, nouns, verbs, adjectives, adverbs, and the like. Examples of other part of speech categories that POS tagger 618 may assign include, but are not limited to, comparative or superlative adverbs, wh-adverbs, conjunctions, determiners, negative particles, possessive markers, prepositions, wh-pronouns, and the like. In some embodiments, the POS tagger 618 may tag or otherwise annotate tokens of a passage with part of speech categories. In some embodiments, the POS tagger 618 may tag tokens or words of a passage to be parsed by the natural language processing system 612.

In some embodiments, the semantic relationship identifier 620 may be a computer module that may be configured to identify semantic relationships of recognized text elements (e.g., words, phrases) in the DR life cycle data. In some embodiments, the semantic relationship identifier 620 may determine functional dependencies between entities and other semantic relationships.

Consistent with various embodiments, the syntactic relationship identifier 622 may be a computer module that may be configured to identify syntactic relationships in a passage composed of tokens. The syntactic relationship identifier 622 may determine the grammatical structure of sentences such as, for example, which groups of words are associated as phrases and which word is the subject or object of a verb. The syntactic relationship identifier 622 may conform to formal grammar.

In some embodiments, the natural language processor 614 may be a computer module that may parse the DR life cycle data and generate corresponding data structures for one or more portions of the DR life cycle data. For example, the natural language processor 614 may output parsed text elements from the DR life cycle data that may be used to generate a label or classification of for a specific hardware model or software versions associated with the DR life cycle data. In some embodiments, a parsed text element may be represented in the form of a parse tree or other graph structure. To generate the parsed text element, the natural language processor 614 may trigger computer modules 616-622.

In some embodiments, the output of the natural language processor 614 may be stored as an information corpus 626 in one or more data sources 624. In some embodiments, data sources 624 may include data warehouses, information corpora, data models, and document repositories that are associated with the DR life cycle data. In some embodiments, data sources 624 may be located on the failed production environment 120, the DR production environment 130, and/or the new production environment 140. The information corpus 626 may enable data storage and retrieval. In some embodiments, the information corpus 626 may be a storage mechanism that houses a standardized, consistent, clean, and integrated copy of the ingested and parsed DR life cycle data used to generate one or more feature vectors. The information corpus 626 may also include a list of concepts found in the ingested DR life cycle data used to generate the failback blueprint plan by the failback advisor 102. The data may be sourced from various operational systems. Data stored in the information corpus 626 may be structured in a way to specifically address analytic requirements. In some embodiments, the information corpus 626 may be a relational database.

In some embodiments, the natural language processing system 612 may include a feature extraction module 630. The feature extraction module 630 may be a computer module that is configured to extract features from the ingested and analyzed DR life cycle data. In some embodiments, the feature extraction module 630 may contain one or more submodules. For example, the feature extraction module 630 may contain an attribute identifier 632 that may be configured to identify one or more attributes (e.g., hardware model types, application dependencies, software specification, versions, etc.) from the extracted feature of the DR life cycle data. In some embodiments, the failback advisor 102 may automatically/continually collect and analyze the DR life cycle data (e.g., upgrades/modification to the DR production environment or the new production environment) using the natural language processing system 612 to understand the IT infrastructure.

Figure 7:
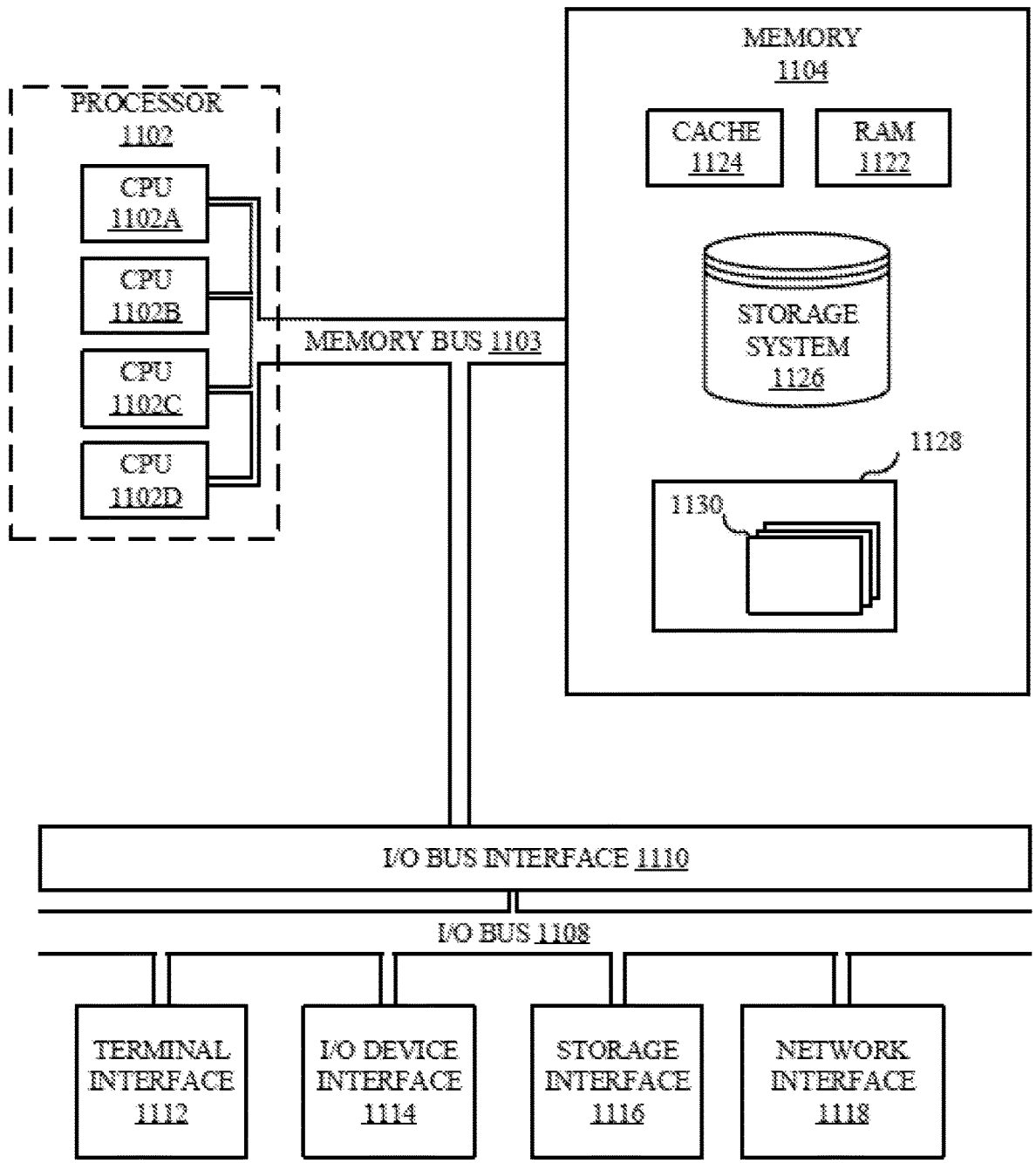
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200 and 300).

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 7 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 1101. In some embodiments, however, individual components may have greater or lesser complexity than as represented in FIG. 7, components other than or in addition to those shown in FIG. 7 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
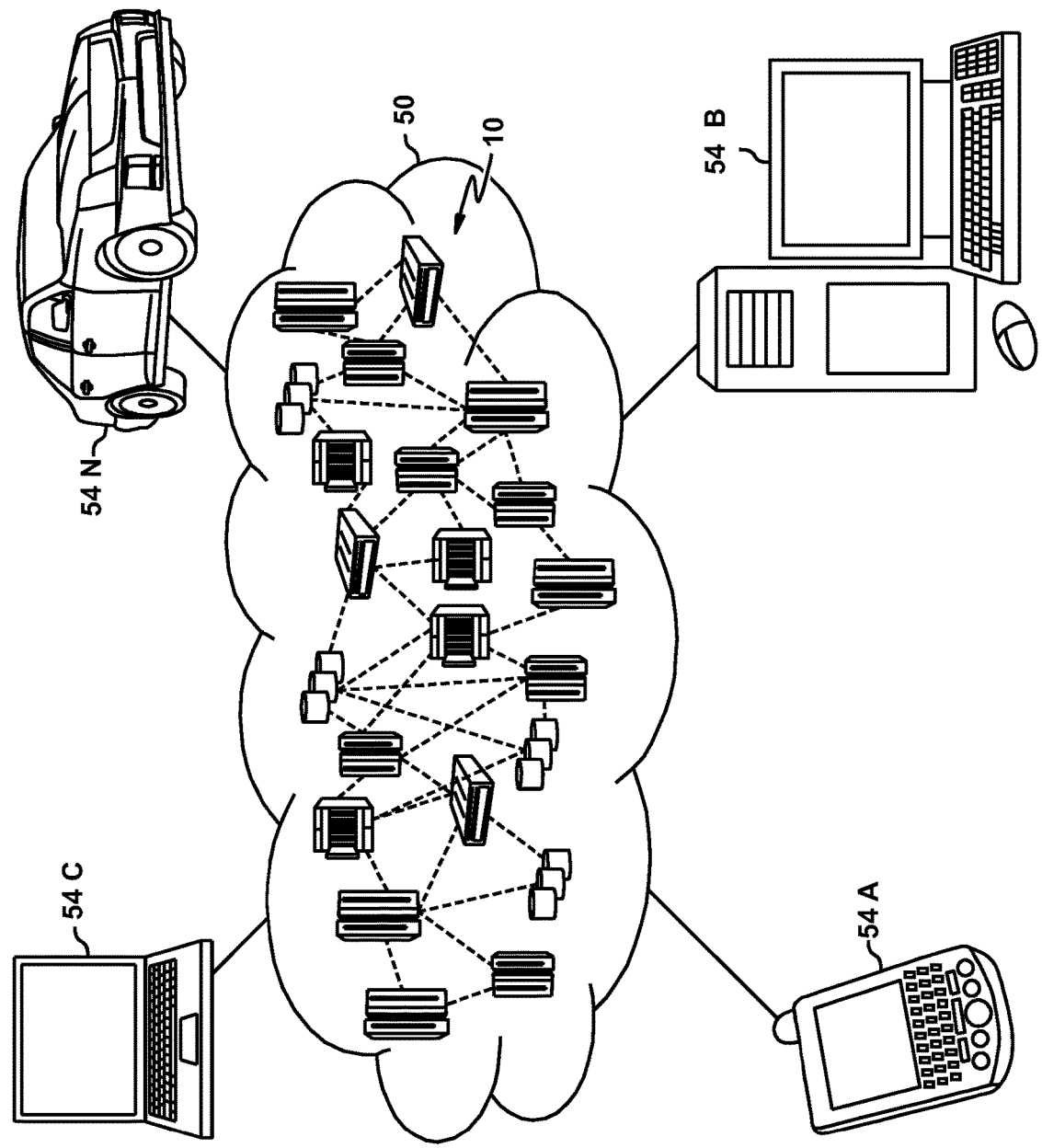
FIG. 8 depicts a cloud computing environment in accordance with embodiments of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
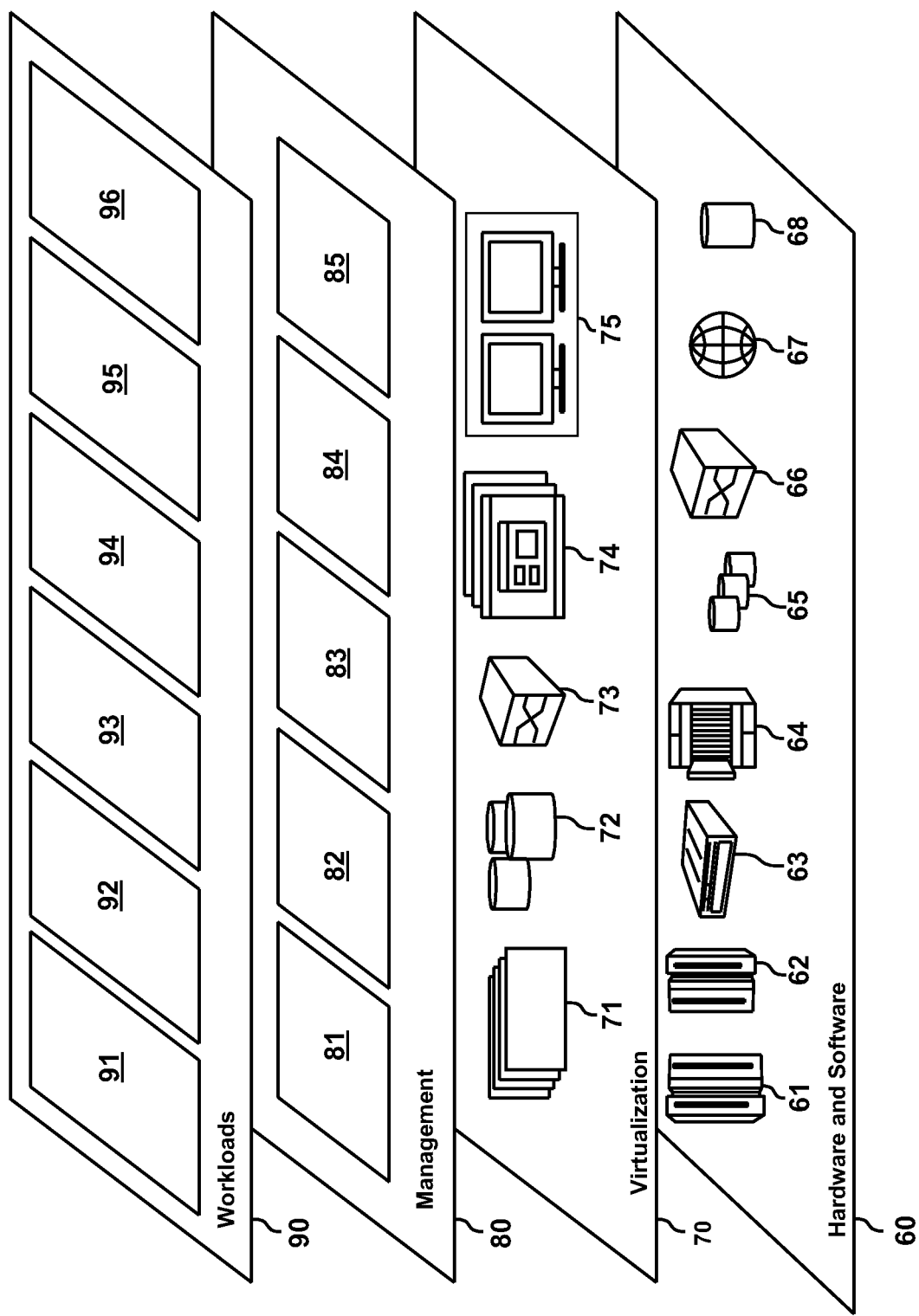
FIG. 9 depicts abstraction model layers in accordance with embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and failback advisor engine software 68 in relation to the failback advisor engine 110 of failback advisor 102 illustrated in FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out attributes of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform attributes of the present invention.

Attributes of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement attributes of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   monitoring a disaster recovery (DR) life cycle during a DR scenario;
   monitoring failover process activities in a DR production environment over a predetermined time period; and
   based on data collected during monitoring of the DR life cycle and the failover process activities in the DR production environment over the predetermined time period,
   generating, using machine learning, a failback blueprint plan to move production to a new production environment, wherein generating the failback blueprint plan comprises:
      performing a capacity check of the DR production environment over the predetermined time period to identify a further growth rate of the new production environment; and
      producing recommendations for the failback blueprint plan based on the capacity check.

2. The computer-implemented method of claim 1, wherein monitoring the DR life cycle comprises monitoring DR production steady state application dependencies and communications to understand application mappings.

3. The computer-implemented method of claim 1, wherein the failover process activities comprises monitoring at least one activity selected from the group consisting of: application sequencing; data movement; bandwidth usage; dependent applications; end user testing; incident management data, manual configurations, change management, and application user testing.

4. The computer-implemented method of claim 1, wherein generating the failback blueprint plan comprises:
   generating, using natural language processing, a compatibility matrix between the DR production environment and the new production environment;
   performing a trend analysis on bandwidth usage for a set of change windows to determine an amount of bandwidth needed during failback;
   determining application grouping to identify which applications are required to be moved together to the new production environment;
   determining a failback schedule for moving the applications to the new production environment; and
   producing recommendations for the failback blueprint plan based on the capacity check and at least one criteria selected from the group consisting of the compatibility matrix, the trend analysis, the application grouping, and the failback schedule.

5. The computer-implemented method of claim 1, further comprising:
   executing the failback blueprint plan in the new production environment; and
   monitoring failback conditions in the new production environment including new production workloads, application latency, and bandwidth dependency metrics.

6. The computer-implemented method of claim 5, further comprising:
   updating, based on a feedback learning model, the failback blueprint plan.

7. The computer-implemented method of claim 5, further comprising:
   generating, using machine learning, a DR retrofit blueprint plan based on the monitored failback conditions for the new production environment and the monitored failover process activities in the DR production environment.

8. The computer-implemented method of claim 7, further comprising:
   reconfiguring the DR production environment based on the DR retrofit blueprint plan.

9. A system comprising:
   a processor; and
   a computer-readable storage medium communicatively coupled to the processor and storing program instructions which, when executed by the processor, cause the processor to perform a method comprising:
   monitoring a disaster recovery (DR) life cycle during a DR scenario;
   monitoring failover process activities in a DR production environment over a predetermined time period; and
   based on data collected during monitoring of the DR life cycle and the failover process activities in the DR production environment over the predetermined time period,
   generating, using machine learning, a failback blueprint plan to move production to a new production environment, wherein generating the failback blueprint plan comprises:
      performing a trend analysis on bandwidth usage for a set of change windows to determine an amount of bandwidth needed during failback; and
      producing recommendations for the failback blueprint plan based on the trend analysis.

10. The system of claim 9, wherein monitoring the DR life cycle comprises monitoring DR production steady state application dependencies and communications to understand application mappings.

11. The system of claim 9, wherein the failover process activities comprises monitoring at least one activity selected from the group consisting of: application sequencing; data movement; bandwidth usage; dependent applications; end user testing; incident management data, manual configurations, change management, and application user testing.

12. The system of claim 9, wherein generating the failback blueprint plan comprises:
- performing a capacity check of the DR production environment over the predetermined time period to identify a further growth rate of the new production environment;
- generating, using natural language processing, a compatibility matrix between the DR production environment and the new production environment;
- determining application grouping to identify which applications are required to be moved together to the new production environment;
- determining a failback schedule for moving the applications to the new production environment; and
- producing recommendations for the failback blueprint plan based on the trend analysis and at least one criteria selected from the group consisting of the capacity check, the compatibility matrix, the application grouping, and the failback schedule.

13. The system of claim 9, wherein the method performed by the processor further comprises:
- executing the failback blueprint plan in the new production environment; and
- monitoring failback conditions in the new production environment including new production workloads, application latency, and bandwidth dependency metrics.

14. The system of claim 13, wherein the method performed by the processor further comprises:
- generating, using machine learning, a DR retrofit blueprint plan based on the monitored failback conditions for the new production environment and the monitored failover process activities in the DR production environment; and
- reconfiguring the DR production environment based on the DR retrofit blueprint plan.

15. A computer program product comprising a computer-readable storage medium having program instructions embodied therewith, the program instructions executable by a processor to cause the processor to perform a method comprising:
- monitoring a disaster recovery (DR) life cycle during a DR scenario;
- monitoring failover process activities in a DR production environment over a predetermined time period; and
- based on data collected during monitoring of the DR life cycle and the failover process activities in the DR production environment over the predetermined time period,
- generating, using machine learning, a failback blueprint plan to move production to a new production environment, wherein generating the failback blueprint plan comprises:
  - generating, using natural language processing, a compatibility matrix between the DR production environment and the new production environment; and
  - producing recommendations for the failback blueprint plan based on the compatibility matrix.

16. The computer program product of claim 15, wherein monitoring the DR life cycle comprises monitoring DR production steady state application dependencies and communications to understand application mappings.

17. The computer program product of claim 15, wherein the failover process activities comprises monitoring at least one activity selected from the group consisting of: application sequencing; data movement; bandwidth usage; dependent applications; end user testing; incident management data, manual configurations, change management, and application user testing.

18. The computer program product of claim 15, wherein generating the failback blueprint plan comprises:
- performing a capacity check of the DR production environment over the predetermined time period to identify a further growth rate of the new production environment;
- performing a trend analysis on bandwidth usage for a set of change windows to determine an amount of bandwidth needed during failback;
- determining application grouping to identify which applications are required to be moved together to the new production environment;
- determining a failback schedule for moving the applications to the new production environment; and
- producing the recommendations for the failback blueprint plan based on compatibility matrix and at least one criteria selected from the group consisting of the capacity check, the trend analysis, the application grouping, and the failback schedule.

19. The computer program product of claim 15, wherein the method performed by the processor further comprises:
- executing the failback blueprint plan in the new production environment; and
- monitoring failback conditions in the new production environment including new production workloads, application latency, and bandwidth dependency metrics.

20. The computer program product of claim 19, wherein the method performed by the processor further comprises:
- generating, using machine learning, a DR retrofit blueprint plan based on the monitored failback conditions for the new production environment and the monitored failover process activities in the DR production environment; and
- reconfiguring the DR production environment based on the DR retrofit blueprint plan.

* * * * *